July 20, 1943. E. F. RIESING 2,324,992
RESILIENT SUPPORT FOR PIPES AND THE LIKE
Original Filed March 16, 1940
FIG. I
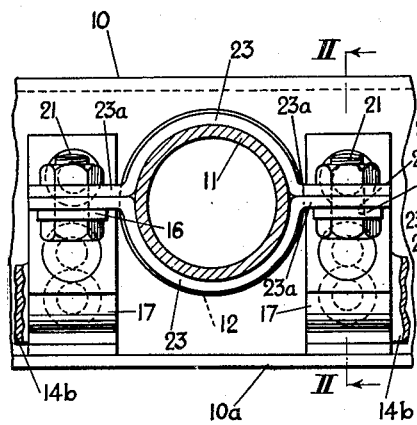
FIG. II
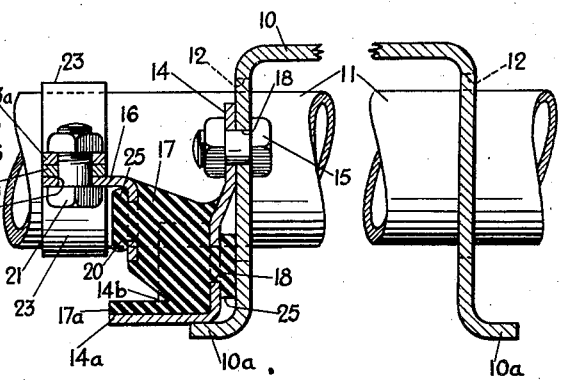
FIG. III
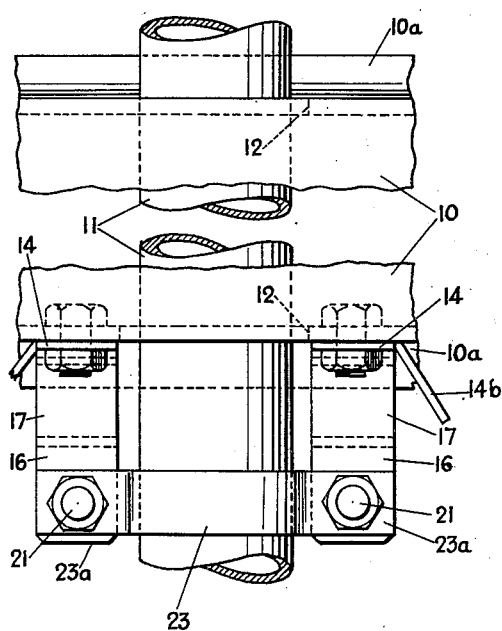
FIG. IV
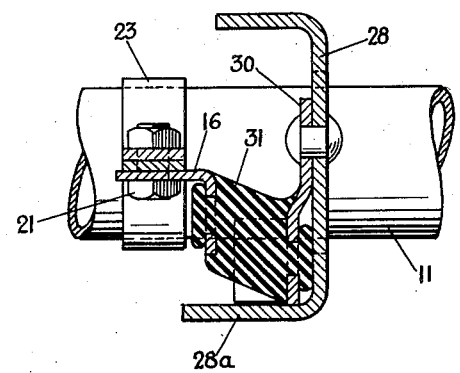
INVENTOR
*ELLWOOD F. RIESING*
BY
ATTORNEYS Patented July 20, 1943

2,324,992

UNITED STATES PATENT OFFICE 2,324,992

RESILIENT SUPPORT FOR PIPES AND THE LIKE

Ellwood F. Riesing, Akron, Ohio, assignor to Firestone Tire & Rubber Company, Akron, Ohio, a corporation of Ohio Original application March 16, 1940, Serial No. 324,340, now Patent No. 2,290,621, dated July 21, 1942. Divided and this application April 9, 1941, Serial No. 387,555

4 Claims. (Cl. 248—358)

This invention relates to resilient supports for pipes and the like, and more especially it relates to devices for resiliently suspending vibrating pipes in an improved manner.

The invention is of primary utility in the supporting of the muffler and/or the exhaust pipe of a motor vehicle, especially in vehicles wherein the motor is supported on rubber mountings and thus is free to oscillate relatively of the frame of the vehicle. The invention also permits the necessary movement in the exhaust pipe and muffler relatively to the vehicle frame when the latter is sprung out of normal alignment, as when one wheel of the vehicle passes over an obstruction. The invention also is designed with the view to conditions arising when the exhaust pipe is longitudinally elongated due to thermal expansion, which elongation frequently amounts to as much as one-quarter inch.

The chief objects of the invention are to provide an improved pipe support of the character mentioned that will prevent the transmission of high frequency vibration between a vibrating structure and its supporting structure; to provide a safety construction whereby there will not be complete separation of the supported and the supporting members upon complete failure of the rubber that constitutes the resilient element of the device of the invention; to provide a device of the character mentioned wherein the rubber of the structure is spaced at an adequate distance from the supported structure so as not seriously to be affected by the heat thereof; to provide a support of the character mentioned comprising rubber, and so arranged with relation to the frame of the vehicle and the exhaust pipe that elongation of the latter due to thermal expansion imparts tension to said rubber; to provide a mechanical interlock of rubber and metal such as to prevent separation thereof even if failure of adhesion between the rubber and metal should occur; and to provide a resilient support of the character mentioned that provides increasing resistance to deformation in one direction at least. Other objects will be manifest as the description proceeds.

This application is a division of prior application for Letters Patent, Serial Number 324,340, filed March 16, 1940, now U. S. Patent Number 2,290,621, issued July 21, 1942.

Of the accompanying drawing:

Figure I is an elevation of an embodiment of the invention in the form usually employed at the front end of an exhaust pipe for supporting the same, said exhaust pipe and a portion of the vehicle frame being shown in operative association therewith;

Figure II is a section on the line 2—2 of Figure I;

Figure III is a plan view of the resilient support shown in Figure I; and

Figure IV is a section similar to Figure II showing another embodiment of the invention.

In motor vehicles of usual construction, an exhaust pipe extends rearwardly from the motor and discharges into the front end of a muffler, and the latter discharges into a tail pipe that extends from the rear thereof to the rear end of the vehicle. The exhaust pipe and tail pipe are supported from various parts of the frame of the vehicle, and sometimes extend through apertures in said frame. Exhaust gases from the motor are very hot, and as a consequence, the exhaust piping and muffler become heated, with resulting thermal expansion of said piping. Since the exhaust piping is connected to the motor at the front end of the car, and said motor is substantially fixed in position with relation to the frame of the vehicle, it follows that elongation of the exhaust piping due to thermal expansion must be in the direction of the rear of the vehicle. The pipe supports constituting the subject matter of this invention are interposed between the vehicle frame and the exhaust piping to support the latter from the frame, and are so positioned with relation to the frame that elongation of the piping, due to thermal expansion, will result in the imparting of tension to the rubber constituent of the pipe support, which condition has been found most satisfactory for the proper functioning of the supports. Thus in the embodiments of the invention shown in the drawing, the resilient supports are attached to the rear faces of the frame members.

Referring now to Figures I to III of the drawing, there is shown a portion of an inverted or downwardly opening channel 10 that constitutes one of the cross members of a motor vehicle frame, said channel having relatively narrow laterally extending flanges 10a at its lower margins, and a section of an exhaust pipe 11. The latter extends through the respective webs of the channel 10, which webs are formed with respective apertures 12 to receive the pipe. The apertures 12 are of substantially larger diameter than the pipe 11 so that vibration of the pipe will not cause it to strike the margins of the apertures.

The resilient support comprises two identical units that are disposed on opposite sides of the pipe 11 and are secured to the latter and to the channel 10 on one side of said channel. Each of said supporting units comprises an attaching plate 14 that is secured to the channel 10 by means of a bolt 15, and a supporting plate 16 that is secured to the pipe 11, and an intervening body of resilient rubber composition 17 that is bonded to each of said plates by being vulcanized thereto. Plates 14, 16 are of strip form, that is, of greater length than width, and both preferably are brass plated to improve the bond of the rubber structure 17 thereto.

The attaching plate 14 is an angular structure having a vertically disposed portion that abuts a web of channel 10, and having a horizontal portion 14a formed integral with its lower end and projecting at right angles therefrom to a position below the lower end of plate 16, said portion 14a preferably resting upon one of the narrow flanges 10a of channel 10. The vertical portion of plate 14 is offset in its medial region so that the lower half thereof stands in spaced relation to the adjacent face of the web of channel 10. The vertical portion of plate 14 is formed with apertures 18, 18 the lowermost of which is disposed in the offset portion of the plate, the upper aperture receiving the bolt 15 by which the plate is secured to the channel 10.

The metal plate 16 is shorter than the plate 14 and is bent at right angles substantially midway between its ends, one end portion being horizontally disposed, and the other end portion extending substantially vertically and downwardly, preferably parallel to the vertical portion of plate 14 and in spaced relation thereto, the lower end of the plate 16 being disposed somewhat above the horizontal portion of plate 14. The respective end portions of plate 16 are formed with apertures 20, of which the aperture in the horizontal portion of the plate receives a bolt 21 by means of which the plate is secured to the pipe 11.

For securing the supporting units to the pipe 11, a two-piece clamp is mounted upon the latter, said clamp comprising straps 23, 23 that have respective arcuate medial portions adapted to embrace the pipe from opposite sides thereof, and laterally extending end portions 23a, 23a, the end portions of one clamp section being parallel to the end portions of the opposing clamp section and in confronting relation thereto. The end portions of the plates 16 are disposed immediately below the end portions 23a of the respective clamp elements so that the latter rest thereon, the bolts 21 extending through the plate ends and clamp ends so as to apply the clamp firmly to the pipe 11 and to secure the respective supporting units to said clamp.

In each supporting unit, the rubber body 17 is disposed between the plates 14, 16 and is chemically and mechanically secured to each of them. The top face of the rubber body 17 slopes somewhat obliquely downwardly from the top face of the plate 16 to the intermediate region of the vertically disposed portion of plate 14. The bottom face of the rubber body 17 covers the lower end of plate 16, and slopes obliquely downwardly therefrom toward the horizontal portion 14a of plate 14, which portion has a layer of rubber 17a upon its top face, said layer 17a being integral with the rubber body 17. The bottom face of the rubber body 17 intersects the portion 17a at an acute angle, the arrangement being such that said surfaces are moved progressively into engagement with each other when the rubber body is deformed by downward movement of the plate 16 relatively of the plate 14. The rubber body 17 extends through apertures 18, 20 in the respective plates 14, 16 and is formed with rivets or buttons 25 on the opposite sides of said plates. The buttons 25 are bonded to the metal plates and provide a mechanical interlock of the rubber and metal. The interlock is strong enough to support the load to be carried by the support even if there should be complete failure of the chemical bond of the rubber to the metal, such as sometimes occurs due to the extreme heat of the exhaust pipe which may be conducted through the metal of the support to the body of rubber. The button 25 on the back of plate 14 is confined between the latter and the adjacent face of the channel 10, whereby deformation of the button, such as would occur before it could be pulled through aperture 18, effectively is opposed. The fact that the horizontal portion 14a of plate 14 extends to a point below the lower end of plate 16 constitutes a safety feature that will function in case there should be complete separation of the rubber body from either plate 14 or 16, in which case the plate 16 would come to rest on the portion 14a of plate 14 and further drop of the pipe 11 would be prevented.

It is also desirable that the rubber bodies 17 offer progressively increasing resistance to lateral deflection of the supporting and the supported members, and to this end the lower, offset portion of each attaching plate 14 is formed, on the lateral margin thereof that is remote from pipe 16, with an integral flange 14b that extends obliquely outwardly to a position at the side of a rubber body 17. The arrangement is such that lateral displacement of the pipe 11 in either direction brings one of the rubber bodies 17 into contact with the adjacent flange 17b, the area of contact progressively increasing in direct proportion to the extent of deflection of the rubber body and thereby effecting progressively increasing resistance to further deflection.

As previously stated, a chief object of the invention is to prevent the transmission of high frequency vibration from a supported structure to a supporting structure. In motor vehicles, for which the mounting constituting the subject matter of the invention is especially applicable, primary vibration of the exhaust pipe is set up by reason of the vibration of the motor, resulting from combustion in the engine cylinders, and secondary vibration is set up by uneven roadways. In the present invention, the problem of preventing the transmission of high frequency vibration to the frame and body of the vehicle is solved by providing a resilient mounting having a low natural vibration frequency. Preferably the natural frequency of vibration of the mounting is not greater than one-third the frequency of vibration of the disturbing force, the latter being the vibration of the motor. To this end the rubber structures 17 of the mounting are composed of rubber composition that is soft and resilient and has a high static deflection under normal load, which in the case of the mounting illustrated is ten to fifteen pounds. The natural frequency of vibration of the mounting is a function of its static deflection, and said frequency of vibration is inversely proportional to the magnitude of static deflection according to physical formula. Thus by providing high static deflection of the mounting, the natural frequency of vibration thereof is reduced well below the frequency of the disturbing vibrations of the motor, and no high frequency vibrations are generated to be transmitted to the vehicle frame. Rubber composition of 30 to 40 durometer hardness has been found very satisfactory for the purpose set forth.

From the foregoing, it will be apparent that the invention provides a safe, simple, and economical support for a hot exhaust pipe for motor vehicles, which readily permits relative movement between the pipe and the frame of the vehicle in all directions. The rubber bodies 17 are positioned far enough from the hot exhaust pipe as not to be seriously affected by the radiation of heat therefrom. Since the rubber bodies 17 are so constructed as to offer progressively increasing resistance to deflection, there is no jar or "bottoming" upon sudden temporary excessive deflection resulting from uneven roadways. The invention effectively prevents the transmission of high frequency vibration between supported and supporting structures and achieves the other advantages set out in the foregoing statment of objects.

The embodiment of the invention shown in Figure IV of the drawing, is essentially similar to that previously described but is especially adapted for use in situations where the supporting channel differs from the channel 10. The channel 28 shown in Figure IV is a laterally opening channel that has a laterally projecting horizontally disposed flange 28a on its lower margin, said flange being substantially wider than the flange 10a of the previously described embodiment of the invention. The resilient mounting differs from the previously described mounting principally in the supporting plates thereof that are attachable to the channel 28. Each of said supporting plates, designated 30, is a vertically disposed metal strip that has its lower portion laterally offset from the upper portion, the lower margin of the plate being arranged to rest upon the flange 28a of the channel 28. The rubber body 31 of the mounting is essentially similar to the rubber body 17 previously described except that its bottom face slopes downwardly to the lower margin of plate 30, but does not cover the same.

The arrangement is such that the flange 28a of the channel 28 serves substantially the same purpose as the horizontal portion 14a of the supporting plate 14 of the previously described mounting. Said flange 28a is arranged for progressive engagement with the bottom face of rubber body 31 upon excessive deflection of the latter, and it underlies the lower end of supporting plate 16 so as to constitute a safety feature in case there is complete separation of the rubber body from the supporting plates.

Other modification may be resorted to without departing from the spirit of the invention, or the scope thereof as defined by the appended claims.

What is claimed is:

1. The combination which comprises a supporting structure, a supported structure fixedly mounted at one end and subject to elongation due to thermal expansion causing it to move relatively of the supporting structure, a pair of plates disposed in the same plane and secured to said supporting structure, a pair of plates disposed in a common plane and secured to said supported structure in parallelism with respective first mentioned plates and so positioned at the side of the latter as to move away therefrom, in the direction normal to the planes of the plates, upon thermal elongation of the supported structure, and a pair of rubber bodies disposed between said second named plates and said first named plates and bonded to each of them, each of said rubber bodies being adapted to be put under tension by such elongation of the supported structure, and to be deflected in a direction transversely of the direction of tension by reason of relative movement of the plates in their respective planes.

2. A resilient support of the character described comprising a metal plate attachable to a supporting structure, a metal plate attachable to a supported structure and spaced laterally from said first mentioned plate, a body of resilient rubber between said plates and bonded to each of them, means obliquely disposed with relation to the bottom face of the rubber body adapted progressively to be engaged thereby upon excessive deflection of the body in a vertical direction, and a flange on one of said plates extending obliquely to a side of the rubber body and adapted progressively to engage a lateral face of the latter upon relative lateral movement of the plates in a horizontal direction.

3. A combination as defined in claim 2 wherein the resilient supports are arranged in pairs, and the oblique flanges of the two plates are arranged to engage the rubber bodies alternatively according to the direction of relative lateral movement of the plates horizontally.

4. The combination which comprises a supporting structure, a supported structure fixedly mounted at one end and subject to elongation due to thermal expansion causing it to move relatively of the supporting structure, a pair of plates disposed in the same plane and secured to said supporting structure, each of said plates formed with a flange perpendicular thereto, a pair of plates disposed in a common plane and secured to said supported structure in parallelism with respective first mentioned plates and so positioned at the side of the latter as to move away therefrom, in the direction normal to the planes of the plates, upon thermal elongation of the supported structure, and a pair of rubber bodies disposed between said second named plates and said first named plates and bonded to each of them, each of said rubber bodies having an oblique surface in substantially the same plane tending progressively to move into contact with a plate-flange as load is applied to said supported structure, each of said rubber bodies being arranged to be put under tension by thermal elongation of the supported structure, and to be deflected in a direction transversely of the direction of tension by reason of relative movement of the plates in their respective planes.

ELLWOOD F. RIESING.